US 6,555,638 B2

(12) United States Patent
Datko et al.

(10) Patent No.: US 6,555,638 B2
(45) Date of Patent: Apr. 29, 2003

(54) PRODUCTION OF WATER-EXPANDABLE STYRENE POLYMERS

(75) Inventors: Achim Datko, Nussloch (DE); Peter Dodel, Rhodt (DE); Klaus Hahn, Kirchheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/028,316

(22) Filed: Dec. 28, 2001

(65) Prior Publication Data

US 2002/0115784 A1 Aug. 22, 2002

(30) Foreign Application Priority Data

Jan. 13, 2001 (DE) ......................................... 101 01 403

(51) Int. Cl.⁷ .................................................. C08F 2/18
(52) U.S. Cl. ........................ 526/201; 526/213; 526/214; 526/225; 521/56; 521/82; 521/146
(58) Field of Search ............................ 521/56, 146, 82; 526/201, 213, 214, 225

(56) References Cited

U.S. PATENT DOCUMENTS 6,127,439 A * 10/2000 Berghmans et al. .......... 521/65
6,160,027 A * 12/2000 Crevecoeur et al. ..... 521/146 X

FOREIGN PATENT DOCUMENTS

| DE | 198 12 857 | 9/1999 |
| WO | WO 98/01489 | 1/1998 |
| WO | WO 98/01501 | 1/1998 |

* cited by examiner

Primary Examiner—Fred Teskin
(74) Attorney, Agent, or Firm—Oblon, Spivak, McClelland, Maier & Neustadt, P.C.

(57) ABSTRACT

A process for the preparation of styrene polymers containing water as the sole expanding agent by polymerization of styrene in aqueous suspension in the presence of an amphiphilic organic emulsifier which carries both hydrophilic and hydrophobic groups, or a polar group-containing, water-miscible polymer.

13 Claims, No Drawings

PRODUCTION OF WATER-EXPANDABLE STYRENE POLYMERS

DESCRIPTION

The invention relates to a process for the production of water-expandable styrene polymers (WEPS) by polymerization of styrene in aqueous suspension, the suspended styrene droplets comprising an emulsion of finely divided water.

Particulate expandable styrene polymers (EPS) are normally prepared by polymerization of styrene in aqueous suspension in the presence of a volatile organic expanding agent. Commonly used expanding agents are hydrocarbons, particularly pentane. For environmental reasons, pentane emitted during production and processing of EPS must be re-collected. This is an elaborate and cost-intensive procedure. Thus it is expedient to replace these organic substances in the long run by more acceptable expanding agents, for example water.

A dissertation of the University of Eindhoven "Water Expandable Polystyrene" by J. J. Crevecoeur dating from 1997 describes a process for the production of WEPS, in which water, finely distributed in styrene, is first of all emulsified by means of surface-active substances, after which the styrene is polymerized up to a conversion of 50%, the mixture is suspended in water with phase inversion and the styrene is finally polymerized to completion by means of peroxide initiators. The surface-active substances used are amphiphilic emulsifiers, eg sodium bis(2-ethylhexyl) sulfosuccinate or sodium styrenesulfonate or block copolymers comprising polystyrene blocks and poly(styrene sulfonate) blocks. All of these substances exhibit both a hydrophilic and a hydrophobic radical and are thus capable of emulsifying water in styrene.

In addition, Patent Applications WO 98/01489 and WO 98/01501 describe two-stage processes for the production of WEPS in which amphiphilic organic substances or water-miscible polar polymers are used as emulsifiers. Express mention is made of the fact that good results are only obtained when prepolymerization in substance is carried out in an initial step.

These processes suffer from the drawback, however, that they are carried out in a complicated manner in two stages: water is first emulsified in the styrene/polystyrene mixture and the organic phase is then suspended in water with phase inversion.

It is thus an object of the invention to provide a simpler, single-stage process for the production of WEPS.

This object is achieved in the present invention in that the emulsifying auxiliary added at the commencement of or during the suspension polymerization is an amphiphilic organic emulsifier, which carries both hydrophilic and hydrophobic groups, or a polar group-containing, water-miscible polymer, and that polymerization is carried out in aqueous suspension right from the start.

The amphiphilic emulsifiers are added in amounts of from 0.1 to 5 wt % and preferably from 0.2 to 3 wt %, based on the monomers. Suitable emulsifiers may be selected from a wide range of compounds. Preferably, the emulsifier is of the type which gives water-in-oil emulsions. The emulsifier can be a non-ionic, an anionic or a cationic surfactant.

Suitable emulsifiers include nonionic surfactants such as sorbitan carboxylates, sorbitol or mannitol carboxylates, glycol or glycerol carboxylates, alkanolamides, alkyl phenols and dialkyl ethers. Any of these emulsifiers may contain a polyalkoxy chain with 1 to 20 oxyalkylene groups, such as oxyethylene or oxypropylene moieties. Suitable anionic emulsifiers include salts of long chain ($C_8$–$C_{30}$) carboxylic acids, long chain ($C_{8-30}$) alkyl sulphonic acid, alkylarylsulphonic acid, sulphosuccinic acid. The cation of these emulsifiers may suitably be an ammonium moiety or an alkali or alkaline earth metal ion. Suitable cationic surfactants can be selected from high-molecular-weight fatty amines, ammonium or other nitrogen derivatives of long chain carboxylic acids. The anionic and cationic emulsifiers may contain a polyoxyalkyl group. Good results have been obtained with bisalkylsulphosuccinates, sorbitol-$C_{8-20}$-carboxylates and/or $C_{8-20}$-alkylxylene sulphonates. Preferred are the metal salts of bis(2-ethylhexyl)-sulphosuccinic acid. Preference is given to bisalkylsulfosuccinates, sorbitol ($C_6$–$C_{20}$) carboxylates and $C_8$–$C_{20}$ alkylxylene sulfonates.

The polar polymers are added in amounts of from 2 to 20 wt % and preferably from 3 to 10 wt %, based on the monomers. Suitable polymers are defined as being capable of absorbing at least 0.5 g of water per gram of dry polymer. The absorption capacity is determined according to ASTM method F 716-82. Suitable absorption capacities range from 0.5 g water/g polar polymer to more than 200 g water/g polar polymer. Although any polar polymer can be used, it is suitably selected from polyvinyl alcohol, polyvinyl acetate, polyacrylic acid, polyethylene glycols and cellulose derivatives. Polyvinylpyrrolidone (PVP) is a preferred polar polymer. This polar polymer is completely miscible with water within the temperature range of 0 to 120° C. The absorption capacity is therefore taken to be higher than 200 g water/g of dry polymer.

Another preferred class of polar polymer is constituted by starch and modified starches. The modification of starch is suitably conducted by esterification or etherification. The water absorption of starch can be increased by gelatinisation. Starch may also be modified by etherification of part of the hydroxyl groups, e.g. from 0.1 to 10%, with an alkyl group, e.g. a $C_1$–$C_6$ alkyl group. Part of the hydroxyl groups may also be esterified. It is possible to make esters with a mono- or a dicarboxylic acid. Suitable acids include acetic, propionic and butyric acid, and malonic, maleic and succinic acid. Preferred acids are succinic acids which contain an alkyl or alkenyl substituent. The alkyl or alkenyl substituent has suitably from 1 to 16 carbon atoms. The dicarboxylic acids may be used in such amounts that from 0.1 to 10% of the hydroxyl groups are esterified. Preferably the mono-ester is formed; the remaining carboxylic group may be left acidic or be converted to a salt, e.g. an alkali metal or ammonium salt.

The polar polymer may have molecular weights which can vary within wide limits such as from 50 to 500,000,000. Suitable molecular weights (weight average molecular weight) range from 50,000 to 750,000.

Preference is given to polyvinylpyrrolidone, which at the same time acts as suspension stabilizer.

In the suspension polymerization of the invention the monomer used is preferably styrene alone. However, up to 20% of its weight can be replaced by other ethylenically unsaturated monomers, such as alkyl styrenes, divinyl benzene, acrylonitrile, 1,1-diphenylethylene or α-methylstyrene.

When carrying out the suspension polymerization, conventional auxiliaries, such as suspension stabilizers, free radical initiators, flameproofing agents, chain-transfer agents, expanding agents, nucleation agents and plasticizers, can be added. It is advantageous to add, as suspension stabilizers, organic protective colloids, preferably in amounts of from 0.1 to 1 wt %, based on the monomers. Examples of suitable protective colloids are polyvinyl alcohol, hydroxyethylcellulose and polyvinylpyrrolidone. So-called pickering stabilizers, such as tricalcium orthophosphate and magnesium diphosphate are less suitable because when they are used together with major amounts of polar polymers, the suspension might coagulate. Preferred flameproofing agents are organic bromine compounds, such as hexabromocyclododecane, which are added in amounts of from 0.1 to 2 wt %, based on the monomers.

It is advantageous to carry out polymerization in the presence of from 1 to 30 wt % and preferably from 3 to 15 wt % of polystyrene, which is advantageously used in the form of a styrenic solution. Instead of pure polystyrene, polystyrene recyclate may alternatively be used.

The solid matter is preferably added at the very start of the suspension polymerization; alternatively, it can be metered in during polymerization until a conversion of 90% has been reached.

The suspension polymerization is advantageously carried out at two temperature levels, use being made of two peroxide initiators which decompose at different temperatures. The suspension is first of all heated to 80° to 90° C., in which case the first peroxide, eg dibenzoyl peroxide, decomposes and polymerization starts. The temperature is then allowed to slowly rise to from 100° to 140° C. During this operation, the second peroxide, eg dicumyl peroxide or tert-butyl perbenzoate, decomposes.

It is advantageous to vigorously stir the batch when carrying out the suspension polymerization. For this reason and due to the assistance of the emulsifying auxiliary, water is emulsified in fine distribution in the suspended styrene droplets.

The WEPS particles formed during suspension polymerization contain from 2 to 20 wt % and in particular from 5 to 15 wt % of water. The ir particle size is from 0.2 to 5 mm and preferably from 0.5 to 2 mm. The y can be expanded with air having a temperature of from 110° to 140° C. to form foamed particles. A particularly elegant foaming process, which leads to expanded particles having a very low settled apparent density, is described in German Patent Application DE 1,981,285.

The expanded particles of WEPS can, like conventional expanded particles of EPS, be welded to form foamed panels, foamed blocks or foamed shaped articles, which can be used as insulating or packaging materials.

The parts and percentages stated in the example below are by weight.

EXAMPLE

In a stirred pressure-tight tank of stainless steel a mixture of 150 parts of water, 0.1 parts of sodium dichosphate, 100 parts of styrene, 0.45 parts of dibenzoyl peroxide and 0.15 parts of tertbutyl perbenzoate (as polymerization initiators) and also 0.65 parts of hexabromocyclododecane (as flameproofing agent) was heated to 90° C. with stirring. Following a period of 2 hours at 90° C., 50 parts of a 10% strength aqueous solution of polyvinylpyrrolidone were added. The mixture was then stirred for a further 2 hours at 90° C., then for 2 hours at 100° C. and finally for 2 hours at 120° C. The resulting granules having an average particle diameter of 0.79 mm had a water content of 3.0%.

The granules were expanded to a bulk density of 95 g/L with air having a temperature of 130° C.

What is claimed is:

1. A process comprising
    polymerizing styrene and, optionally, one or more comonomers, in an aqueous suspension,
    wherein an emulsifying auxiliary is added to the aqueous suspension at the commencement of or during the polymerization,
    wherein the emulsifying agent is an amphiphilic organic emulsifier having both hydrophilic and hydrophobic groups, or a polar group-containing water-miscible polymer,
    wherein the aqueous suspension comprises suspended styrene droplets, and
    wherein water is emulsified in the styrene droplets.

2. The process of claim 1, wherein the amphiphilic emulsifier is added in an amount of from 0.1 to 5 wt %, based on the monomers.

3. The process of claim 1, wherein the polar group-containing polymer is added in an amount of from 2 to 20 wt %, based on the monomers.

4. The process of claim 3, wherein the polar group-containing polymer is polyvinylpyrrolidone.

5. The process of claim 1, wherein the suspension polymerization is carried out in the presence of an organic protective colloid.

6. The process of claim 1, wherein the suspension polymerization is carried out in the presence of polyvinylpyrrolidone.

7. The process of claim 1, wherein the polymerization is carried out in the presence of an amphiphilic organic emulsifier present in an amount of from 0.2 to 3 wt % based on the weight of the monomers.

8. The process of claim 1, wherein the polymerization is carried out in the presence of an amphiphilic organic emulsifier selected from the group consisting of a bisalkylsulfosuccinate, sorbitol ($C_8$–$C_{20}$) carboxylate and a $C_8$–$C_{20}$ alkylxylenesulfonate.

9. The process of claim 1, wherein the styrene polymer comprises 80% or more of styrene.

10. The process of claim 1, wherein the polymerization is carried out in the presence of from 1 to 30 wt % of polystyrene.

11. The process of claim 1, further comprising expanding the styrene polymer with air.

12. The process of claim 1, wherein the polymerization is carried out in the presence of a first peroxide initiator decomposing at a temperature of from 80 to 90° C. and a second peroxide initiator decomposing at a temperature of from 100 to 140° C.

13. The process of claim 1, wherein styrene is polymerized to form a styrene polymer comprising water as the sole expanding agent.

* * * * *